Sept. 24, 1968   N. E. PONTECORVO ETAL   3,403,030
METHOD FOR PROCESSING CHEESE CURD INTO PLASTICIZED
CHEESE OF THE MOZZARELLA TYPE
Filed Sept. 24, 1965   5 Sheets-Sheet 4
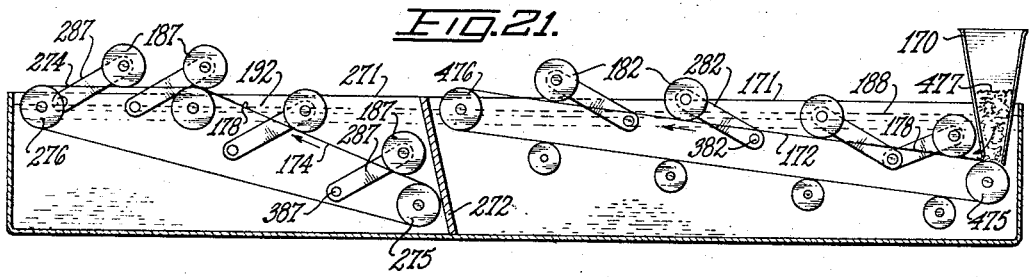
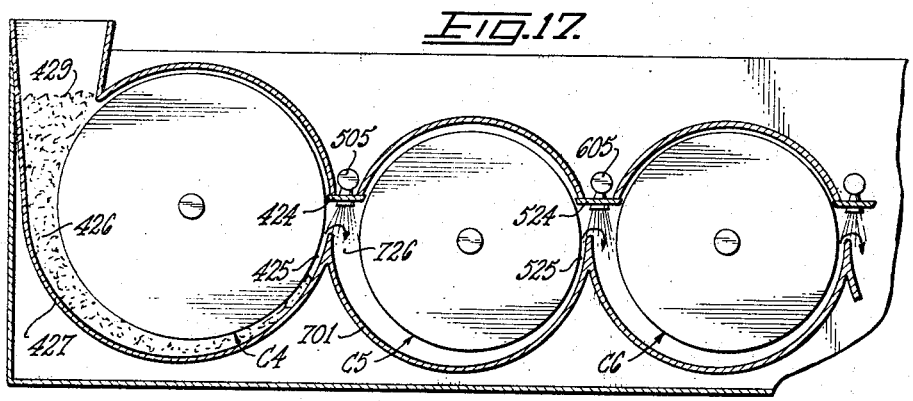
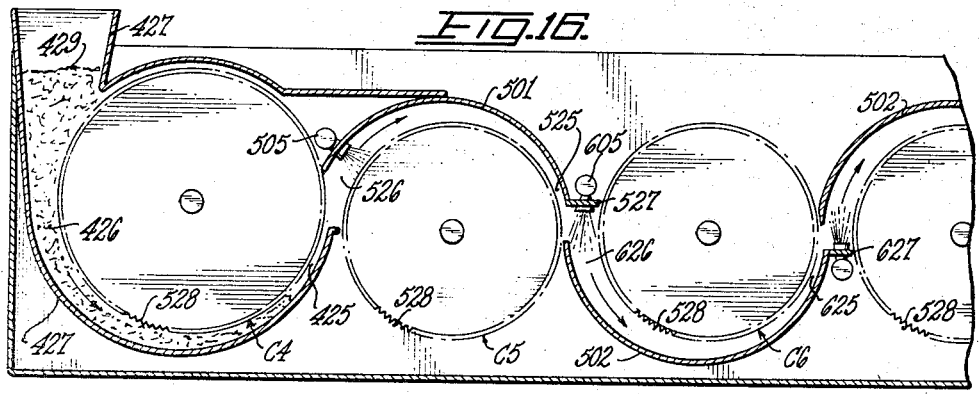
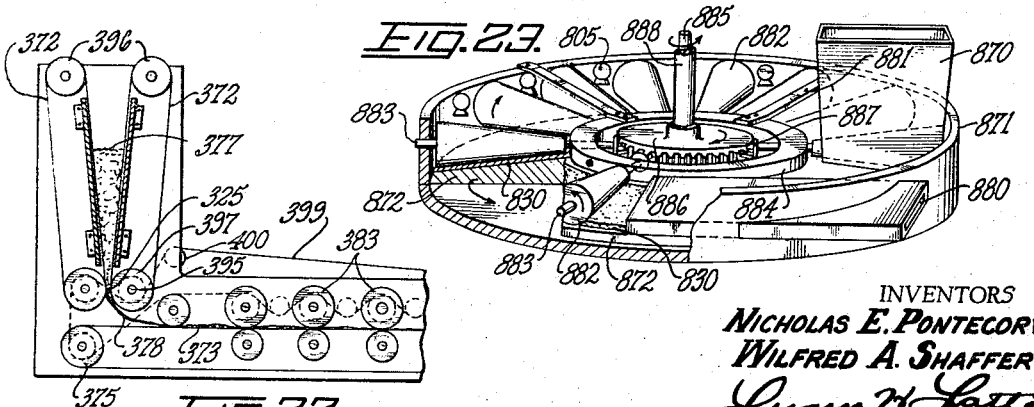
INVENTORS
NICHOLAS E. PONTECORVO
WILFRED A. SHAFFER
ATTORNEY

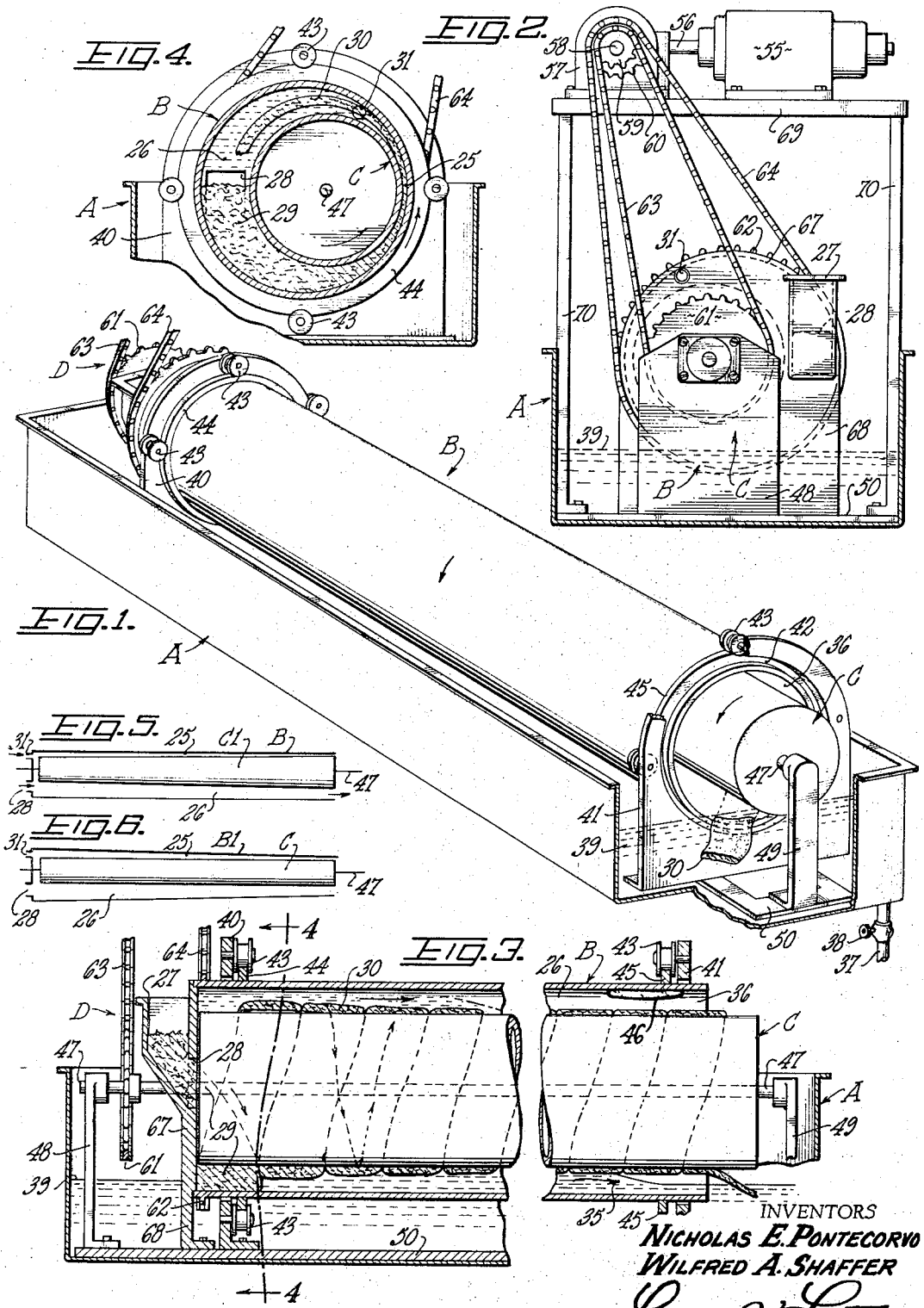

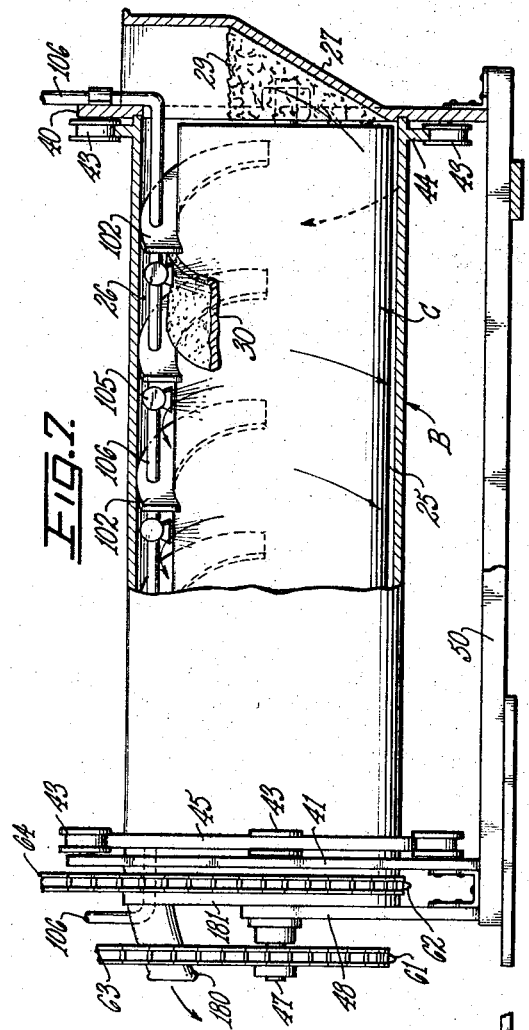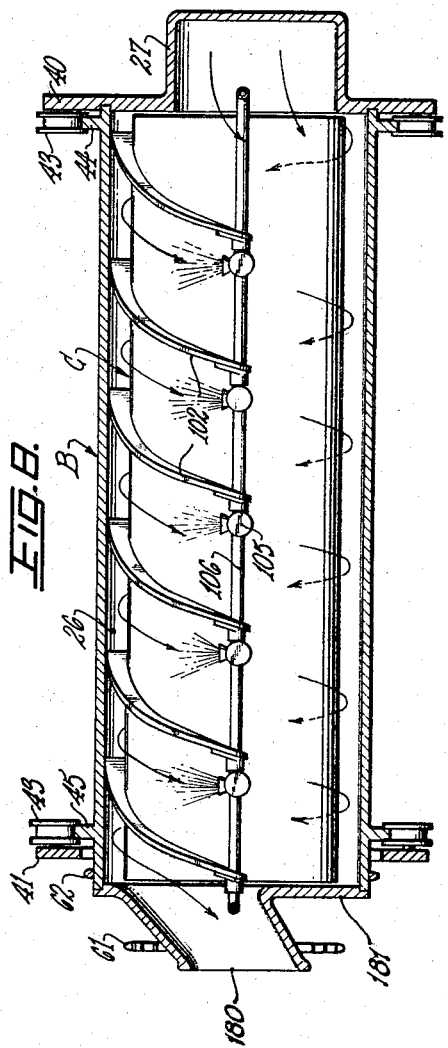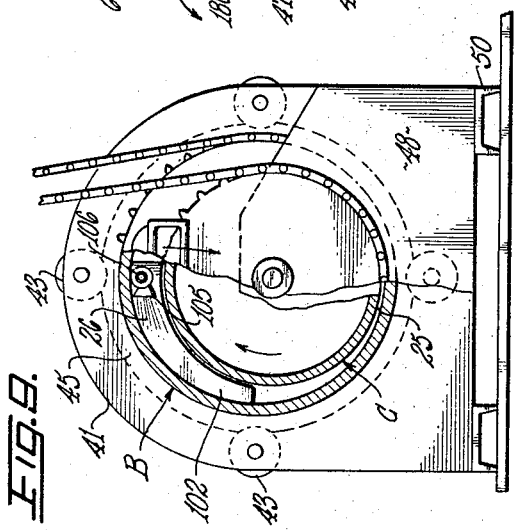

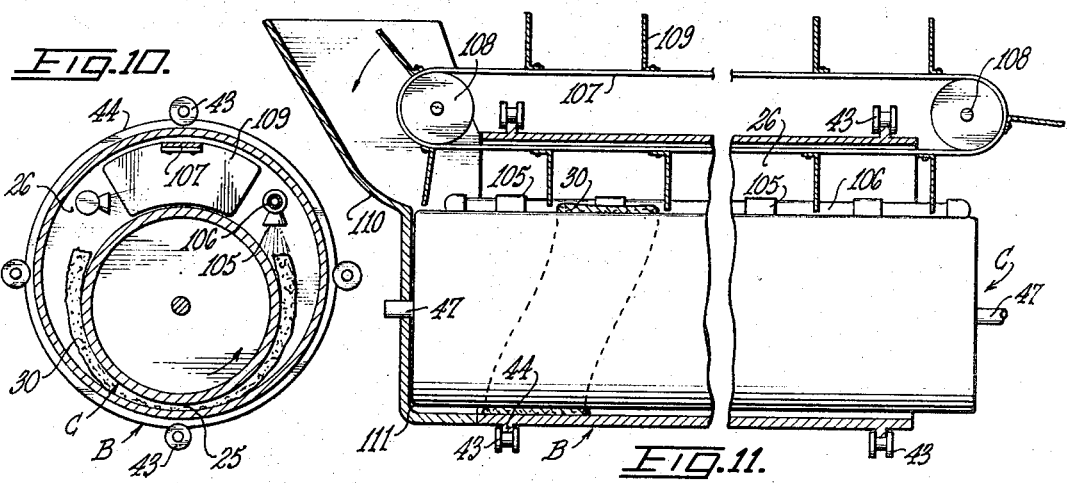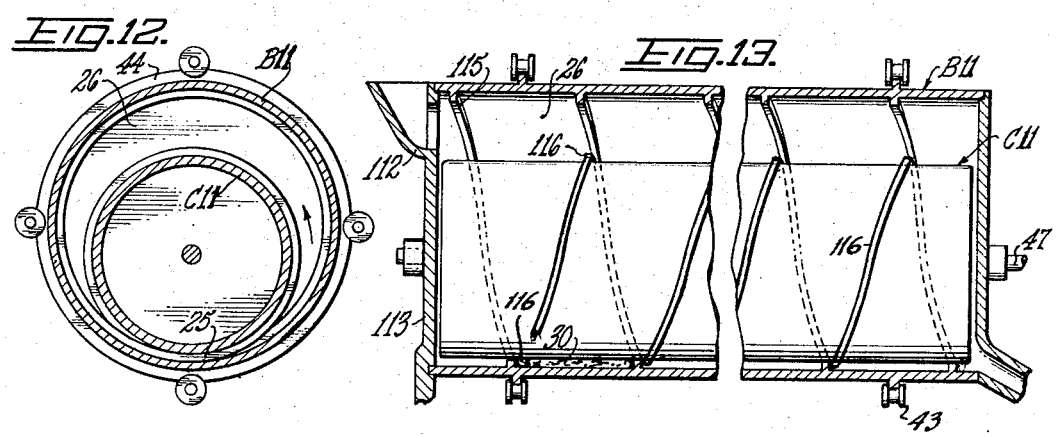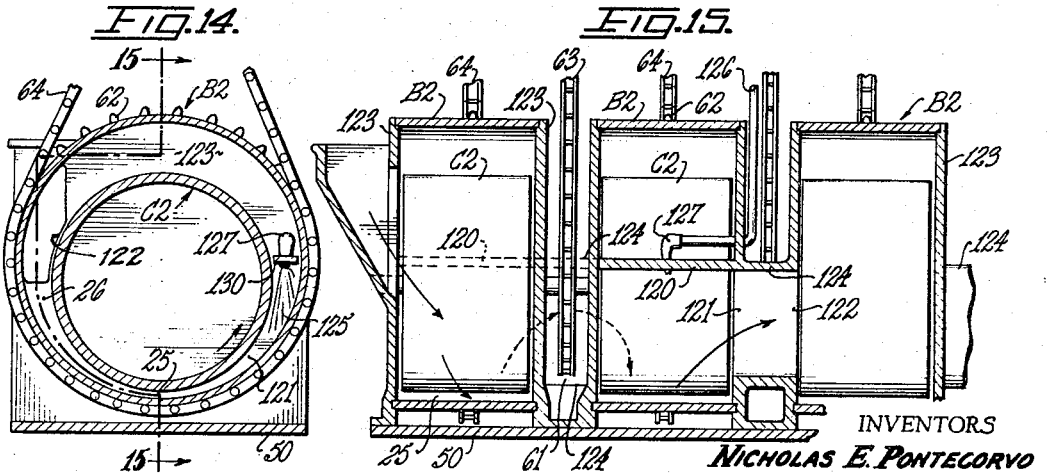

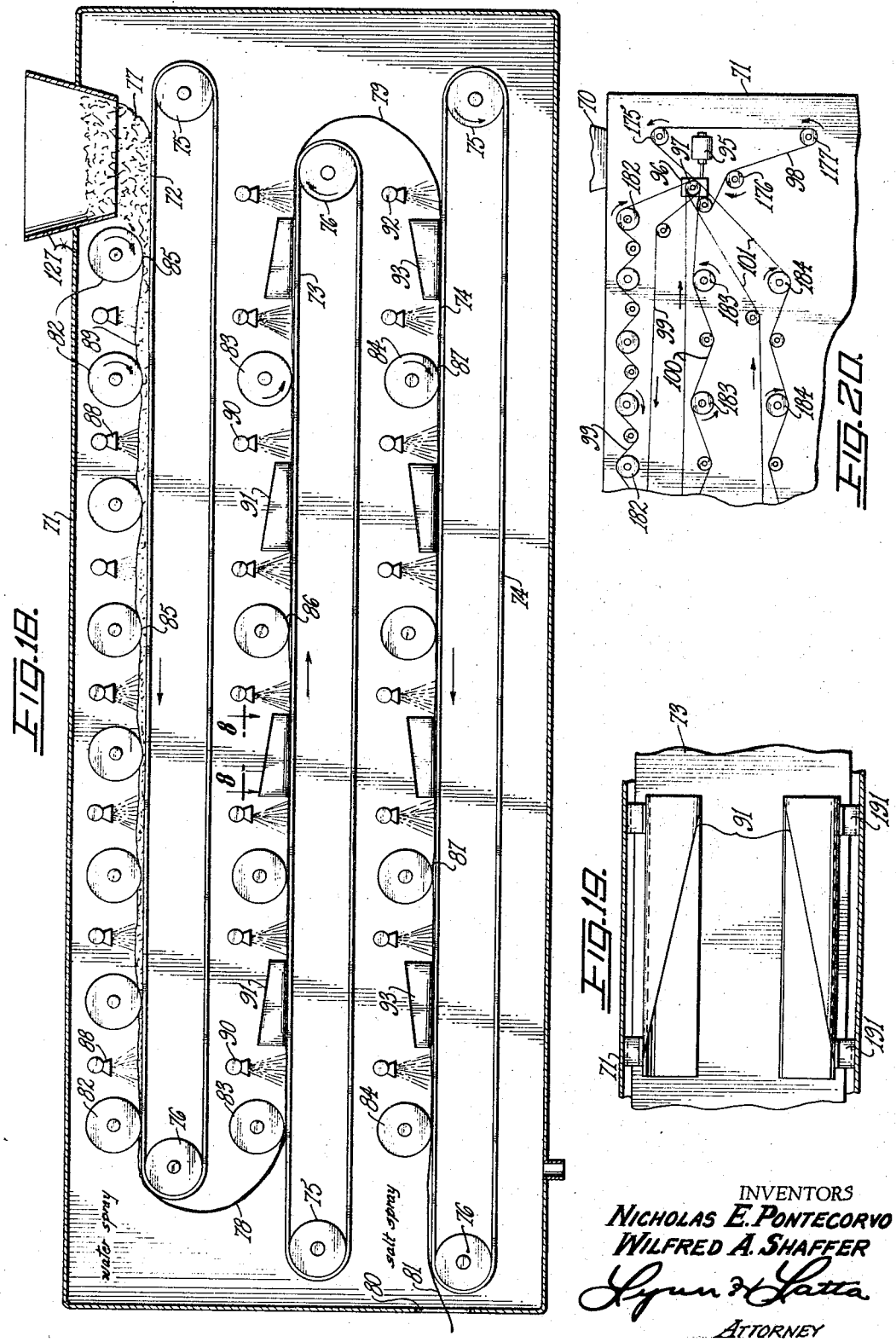

United States Patent Office 3,403,030
Patented Sept. 24, 1968

3,403,030
METHOD FOR PROCESSING CHEESE CURD INTO PLASTICIZED CHEESE OF THE MOZZARELLA TYPE
Nicholas E. Pontecorvo, Tarzana, and Wilfred A. Shaffer, Los Angeles, Calif., assignors, by mesne assignments, to Nicholas E. Pontecorvo, Tarzana, Calif.
Filed Sept. 24, 1965, Ser. No. 489,833
16 Claims. (Cl. 99—116)

This invention relates to the processing of cheese of the plasticized type such as mozzarella and has as its general object to provide an automatic continuous process for converting raw cheese curd into plasticized cheese.

An existing commercial method of processing plasticized cheese is a batch method wherein water at approximately 180° F. is added to a large batch of curd in a vat, the water being sufficiently hot or of appropriate volume so that upon equalization of the temperature throughout the body of curd, an average temperature of approximately 130° F. (the optimum temperature) can be equalized throughout the batch of curd, the curd in the outside of the batch is overcooked, resulting in the driving off of a considerable portion of its fat content and damaging the quality of the outer layers of curd before the stirring apparatus can fairly mix the hot water into the internal area of the curd body. After the additon of the hot water to the curd the batch is subjected to prolonged stirring to effect absorption of the water into the curd and to reduce the curd from nodule form to a more homogenous, softened state. It is subsequently necessary to remove portions of the softened cheese body and to subject them to kneading operations to reduce the water content and to further compact the cheese body into the smooth, uniform, plasticized texture of mozzarella and other cheeses of the plasticized type. After the plasticized cheese has been molded and cooled it is steeped in brine to add a required salt content, which requires steeping for an extended period of time.

The general object of the present invention is to simplify and improve over this batch method, by providing a continuous-flow method wherein water at the optimum temperature of 130° F. is added continuously to a continuous shallow flow of cheese curd being fed into the processing apparatus, wherein the stream of curd is subjected to alternate stages of compression and expansion, absorbing water during the expansion stages; wherein salt is added to a continuously flowing stream of plasticized cheese after a number of such stages of compression and expansion have reduced it to a ribbon or web of plasticized cheese in a substantially homogenous state; and wherein, during the final stages of alternate compression and expansion (kneading), the stream of plasticized cheese is reduced to a thin ribbon of substantially uniform texture which can readily be converted to cheese slices or doubled back upon itself so as to build it into a brick or other suitably thick body of plasticized cheese.

A particular object of the invention is to apply heated water to a thin stream of flowing curd in a manner to control the volume and speed of travel of the curd along a processing path, and also to cause the curd to rapidly absorb water and heat for plasticizing it.

A further object is to apply a brine solution of powdered salt spray to a thin moving web of plasticized cheese (or a thin moving stream of curd) so as to rapidly impart a required salt content without prolonged steeping.

A further object is to provide such a process wherein moisture content can be controlled by alternate stages of compressive rolling and of application of moisture, and by selective reduction or elimination of the applied moisture in connection with some of the rolling stages, and with selective use of radiant or radio heating to withdraw moisture.

A further object is to provide an improved apparatus for carrying out the process of the invention.

Other objects and advantages will become apparent in the ensuing specification and appended drawing in which:

FIG. 1 is a perspective view of an apparatus for performing one form of the process of the invention;

FIG. 2 is an end view of the same with the tank shown in section, looking at the far end of the apparatus as seen in FIG. 1;

FIG. 3 is a fragmentary longitudinal vertical sectional view of the apparatus;

FIG. 4 is a transverse sectional view thereof taken on the line 4—4 of FIG. 3;

FIG. 5 is a schematic horizontal axial sectional view of the apparatus of FIG. 1, slightly modified;

FIG. 6 is a schematic horizontal longitudinal sectional view of the apparatus of FIG. 1 with another slight modification;

FIG. 7 is a side-elevational and vertical longitudinal sectional view of a modified form of apparatus for performing the procsss of the invention;

FIG. 8 is a horizontal axial sectional view of the same, illustrating the means for feeding the cheese web axially through the apparatus;

FIG. 9 is a transverse sectional view of the same, partially in end elevation;

FIG. 10 is a cross sectional view of another modified form of apparatus for performing the process of the invention;

FIG. 11 is a vertical longitudinal sectional view of the essential parts of the apparatus of FIG. 10;

FIG. 12 is a cross sectional view of another modified form of apparatus for performing the process of the invention;

FIG. 13 is a fragmentary longitudinal sectional view of the essential parts of the apparatus of FIG. 12;

FIG. 14 is a cross sectional view of another modified form of apparatus for performing the process of the invention;

FIG. 15 is a longitudinal sectional view of the same, taken on the line 15—15 of FIG. 14;

FIG. 16 is a longitudinal vertical sectional view of another modified form of apparatus for performing the process of the invention;

FIG. 17 is a longitudinal vertical sectional view of another modified form of apparatus for performing the process of the invention;

FIG. 18 is a longitudinal vertical sectional view of an apparatus for performing a modified form of the method;

FIG. 19 is a horizontal longitudinal sectional view of the apparatus of FIG. 18 illustrating one of the units for turning the margins of the cheese web;

FIG. 20 is a fragmentary side elevational view of the same illustrating drive mechanism for the conveyors and rollers thereof;

FIG. 21 is a schematic longitudinal vertical sectional view of a modified form of the apparatus of FIGS. 18–20;

FIG. 22 is a fragmentary longitudinal vertical sectional view of another modified form thereof; and FIG. 23 is a perspective view, partially broken away and shown in section, of a further modified form of apparatus for performing the invention.

Referring now to the drawings in detail and in particular to FIGS. 1–4, we have shown therein, as an example of one form in which the invention may be embodied, a cheese plasticizing apparatus comprising, in general, a tank or tray A: a cylindrical housing B extending longitudinally in the tank A and mounted for rotation therein; a cylindrical mandrel C extending longitudinally through the housing B and mounted for rotation in the same direction as the housing B, in an eccentric position; and drive mechanism which is indicated generally at D.

A narrow pass 25 is defined between opposed, adjacent sides of the housing B and mandrel C. A relatively wide chamber 26 is defined between the opposite sides of the housing B and mandrel C. A charging hopper 27 (FIG. 3) leads to an inlet port 28 which communicates with the wide chamber 26, for delivering a body of cheese curd 29 into the chamber 26 at the charging end of the apparatus. The rotation of the housing B and mandrel C, counterclockwise as seen in FIG. 1 and FIG. 4 and as indicated by the arrows therein, causes the raw curd 29 to be drawn between the housing and mandrel from the chamber 26 through a gradually narrowing extension thereof which becomes the pass 25, and thus the raw curd is gradually and increasingly compressed until it is drawn through the pass 25 in the form of a thin, highly compressed web. This web then passes upwardly over the mandrel C, expanding as it enters a gradually broadening area of chamber 26. The expanding web, passing over the mandrel C, is indicated at 30.

A water inlet port 31 communicates with the broadening area of chamber 26 just above the pass 25. Water, heated to about 180° F., is introduced into the chamber 26 through the port 31, and flows over the web 30 and beneath it, tending to separate it from the surface of the mandrel C so as to prevent adherence of the web to the mandrel.

As indicated by the 4—4 section line in FIG. 3, the showing of expanding web 30 passing over the mandrel is discontinued just above the charging port 28 so that the latter may be clearly seen in FIG. 4. The web 30, as it passes the water inlet port 31, is subjected to the axially directed force of the inflowing stream of water which displaces it axially over the mandrel C, causing the ribbon-like web 30 to pass the incoming flow of raw curd 29, substantially clearing the same, winding loosely around the mandrel C in the form of a helix as shown in FIG. 3. We find that the axial flow of water, as indicated by the arrows in FIG. 3, inhibits any tendency of the web 30 to wrap tightly around the mandrel C. The web continues to travel a helical path, rotating with the rotating mandrel C and gradually advancing along the length thereof substantially in the manner of the thread of a screw advancing in a female thread with a screw-threading action.

As the web 30 is carried in repeated rotations around the mandrel C, it is repeatedly drawn through the narrow pass 25 and subjected to a compressing action followed by an expanding action in the upper portion of chamber 26, each time it thus passes around the mandrel. Thus the web 30 is subjected to repeated alternate compression and expansion which provides a kneading action which gradually processes the cheese into plasticized form, water being absorbed during each stage of expansion in the upper portion of chamber 26.

The water which flows longitudinally through the housing B flows into the tank A at the discharge end of the machine remote from the charging end, as indicated by the arrow at 35, the discharge end of housing B being open at 36. The water may be recirculated by suitable pumping means (not shown) from the tank back to the inlet port 31. Alternatively, fresh water may be continuously supplied to the inlet port 31 through a suitable connection to a supply source (not shown) and may be continuously drained from the tank A through a suitable drain outlet 37 (FIG. 1) with suitable control of outflow by means of a valve 38, such as to maintain a body of water 39 in the tank at a level slightly above the bottom of the housing B as indicated in FIG. 1.

The volume and speed of flow of the water are selectively varied so as to assist in controlling (1) the volume of curd which is fed from the hopper into chamber 26, and (2) the speed at which the stream of curd travels along the mandrel.

When the curd is compressed and subsequently released under water, it absorbs both moisture and heat, the latter being the principal factor in making the curd plastic.

With the kneading pass 25 located well above the bottom of the housing B, it is possible, by controlling the volume and flow of water, to leave a portion of the length of pass 25, and/or the expansion area of chamber 26 immediately above the pass, open and free of water as indicated at the rightward end of FIG. 3. Thus a selected number of turns of the web can be subjected to stages of kneading without application of water so as to avoid further addition of moisture, thus regulating the moisture content. In some operations, it may be desirable to adjust the moisture content by heating one or more of these turns so as to withdraw some of the moisture. Accordingly, a heat source such as an infra-red lamp, indicated at 46 in FIG. 3, or a high frequency induction heating device, may be provided in the area of rolling without addition of moisture.

The web of processed cheese 30 will be fed out of the open end 36 of housing B, and can be collected in the bottom of tank A, for intermittent severance and removal of collected quantities by an attendant workman. The invention contemplates, however, as a preferable method of continuous processing, the use of a suitable elevating conveyor of endless belt form (not shown) having a receiving end operating in the tank A, for continuously elevating the web 30 out of the tank and thence conveying it beneath a succession of brine sprays (or granulated salt dispensers) for salting the web. In the further stage of processing intermittent stages of salting are alternated with stages of kneading by passing the web under rollers, all as described more in detail in the description hereinafter of the modified form of the process utilizing the apparatus of FIGS. 16–18.

THE APPARATUS OF FIGS. 1–6

In the foregoing description of one form of the process, the apparatus used in practicing the same has been partially described. Such apparatus includes a pair of bracket arches 40, 41 each having a circular aperture 42 through which a respective end of the housing B extends, and each having a series of flanged rollers 43 rotatably supported thereby. The respective ends of the housing B, adjacent the respective bracket arches 40, 41, are provided with respective track collars 44, 45 of flat, radial ring form, secured integrally to the housing B and having their peripheral margins rollingly engaged in the annular grooves of the rollers 43, thus supporting the housing B for rotation.

The mandrel C is supported by means of end trunnions 47 (which may be the respective ends of a through shaft as indicated in FIG. 3), these trunnions being journalled in bearings on the upper ends of respective end brackets 48, 49. The bracket arches 40, 41 and the end brackets 48, 49 may all be secured to a suitable base frame 50 resting on the bottom of the tank A.

The driving mechanism D (FIG. 2) comprises a suitable motor 55 having a shaft 56 driving a reduction gear unit 57. The gear unit 57 has a shaft 58 driving a pair of drive elements (e.g. sprockets) 59 and 60. The mandrel C and housing B are provided with corresponding drive elements 61, 62 aligned with the respective drive elements 59, 60 in respective vertical planes and receiving drive therefrom through suitable flexible drive elements (e.g. chains) 63 and 64. Equivalent pulley and belt drives may be substituted for the chain drives illustrated. The sprocket 61 is secured on the trunnion 47 at the charging end of the machine and the sprocket 62 is a ring sprocket encircling the charging end of the housing B.

The charging end of housing B is closed by a circular closure plate 67 which is suitably supported by means of a bracket 68 secured to base frame 50. The charging port 28 is formed in one side of the closure plate 67 so as to register with the wider mid-area of processing chamber 26, and the charging hopper 27 may be formed integrally with the closure plate 67 as shown in FIG. 3. The water inlet 31 is defined by a fitting secured in the closure plate 67 and having a projecting external portion (FIG. 2) to which a suitable water hose or pipe is coupled.

Motor 55 and reduction gear unit 57 are suitably supported on a platform 69 carried by legs 70 mounted on the base frame 50.

The housing B and mandrel C as shown in FIGS. 1–4 are both cylindrical and therefore of uniform diameter from end-to-end. The invention can be satisfactorily practiced where the gap 25 is of uniform width throughout substantially the full length of the housing B, in which case the axes of rotation of the two cylindrical members are parallel. However, as a preferred embodiment of the process and apparatus of FIGS. 1–6, the pass 25 is of gradually narrowing width from maximum width at the charging end to minimum width at the discharge end of the apparatus. This can be accomplished by arranging the axes of the two cylindrical members so as to converge from the charging to the discharge end of the apparatus. It can also be accomplished by utilizing a mandrel C1 (FIG. 5) which is slightly frusto-conical, increasing in diameter toward its discharge end; or by utilizing a housing B1 (FIG. 6) which is frusto-conical, tapering slightly from maximum diameter at its charging end to minimum diameter at its discharge end.

Where the gap 25 is progressively narrow toward the discharge end of the apparatus, the web 30 will be progressively rolled thinner until, at the discharge end, it can be of slice-thickness such that by trimming its side margins and/or severing the web transversely at properly measured intervals, it may be converted into finished sandwich slices ready for packaging as sliced cheese. The use of the mandrel C1 of progressively increasing diameter has the further advantage of at least compensating for the tendency of the web 30 to increase in diameter in each of the helical terms thereof as it is progressively reduced in thickness.

The continuous pass 25, extending the full length of the apparatus, may be regarded as providing, in effect, a series of passes each equal to the width of the web 30 being rolled therethrough. Where the converging relation (e.g. of FIG. 5 or FIG. 6) is utilized, each of the successive passes will be progressively narrower than the last.

THE METHOD AND APPARATUS OF FIGS. 7–9

Referring now to FIGS. 7–9, there is disclosed therein an apparatus for performing a method which is generally similar to the method performed by the apparatus of FIGS. 1–6, the cheese web 30 being rolled between a cylindrical mandrel C and a cylindrical housing B eccentrically arranged to define a pass 25 in which the web is compressed, and with their opposed surfaces rotating in unison at the narrowest point of the pass 25, as in FIGS. 1–6. The mandrel C and housing B may be supported and driven by supporting bearings and rollers and drive mechanism as shown in FIGS. 1–4 to which references is made for such details, the same reference numerals being applied.

The apparatus of FIGS. 7–9 differs from that of FIGS. 1–6 principally in that the movement of the helically coiled web 30 longitudinally along the mandrel C is effected positively by mechanical means which is disposed in the chamber 26 which in this arrangement is centered at the top of the apparatus (the pass 25 being at the bottom), and water for moistening the web during its expanding stage is provided by a series of spray heads 105 mounted on a water supply pipe 106 extending longitudinally through the chamber 29 and through the ends thereof.

The web 30 is moved longitudinally upon the mandrel C by means of fixed guide vanes 102 occupying one quadrant of the processing chamber 26 (the expanding side of the upper half of the chamber) and pitched at an angle corresponding to the pitch of the helical web 30 wound around the mandrel C. The engagement of the web 30 against the vanes 102 provides a positive deflecting action which causes the web to travel in the desired path.

The vanes 102 may be fixed to the supply pipe 106 and thus held in their fixed positions. The sprays from the spray heads 105 are directed against the top of the mandrel C, lubricating the same to inhibit adherence of the web 30 to the mandrel, and impinging against the expanding web between the vanes 102 so as to provide moisture which is absorbed by the expanding web.

The processed web 30 may be delivered from the discharge end of the machine through a nozzle 180 in an end plate 181 carried by end bracket 48 and closing the discharge end of housing B.

THE PROCESS AND APPARATUS AS DISCLOSED IN FIGS. 10, 11

FIGS. 10 and 11 disclose an alternative apparatus for practicing the method substantially the same as in FIGS. 7–9, the cheese web being moved longitudinally along the top of mandrel C by mechanical conveying apparatus.

The conveying apparatus comprises an endless belt or chain 107 traveling on rollers or sprockets 108 and carrying a series of vanes 109 which are fitted sufficiently closely to the surface of mandrel C to engage the web 30 thereon and to move it longitudinally. Spray heads 105 may be directed partially against the mandrel C so as to inhibit the sticking of the web to the mandrel, but are directed principally upon the expanding web coming through the pass 25.

Cheese curd is introduced into the apparatus through a hopper 110 extending downwardly around the end of mandrel C at 111 at the charging end of the machine and fitted to the end margin of housing B so as to retain the cheese curd in the inlet end of the processing chamber 26 until it has been developed into the web 30. The conveyor 107–109 operates in the hopper 110 to move the curd into the processing chamber 26.

THE METHOD AND APPARATUS OF FIGS. 12, 13

FIGS. 12 and 13 disclose a further modification of the invention, generally similar to that of FIGS. 10, 11 in that the cheese curd is compressed in a restricted pass 25 after being delivered into the inlet end of a procesing chamber 26 defined between eccentric mandrel and housing members C11 and B11 through a hopper 112 formed as part of a charging end closure plate 113, the mandrel and housing being rotatably supported and driven by means which can be substantially the same as that disclosed in FIGS. 1–4.

The means for feeding the web longitudinally along the mandrel C11 in this apparatus comprises a helical conveyor rib 115 on the inner surface of housing B1 and/or a helical conveyor rib 116 on the surface of mandrel C1. Where both ribs are utilized as shown, they are preferably arranged so as to meet in closely adjacent overlapping relation in the pass 25 so as to substantially close the pass behind the trailing margin of the cheese web and thereby provide a more positive feed along the surface of the mandrel. The invention also contemplates, as an alternative, the use of just the rib 116 on the mandrel, relying upon sufficient closeness of wrapping at the web around the mandrel to retain it in the helical channels defined between the turns of the rib 116 and thus causing the web to feed in the exact helical pass corresponding to this helical channel.

THE METHOD AND APPARATUS OF FIGS. 14, 15

FIGS. 14 and 15 disclose a further modified form of the invention wherein the cheese web 130, developed by compression and rolling through successive restricted passes 25 in a series of rolling units E, F, G, etc., is fed against a fixed baffle 120 traversing the outlet chamber 125 of each pass 25, and is thereby directed axially through an outlet port 121 into an inlet port 122 of the next rolling unit, the port 122 registering with the outlet port 121.

In passing through the inlet port 122 into the next unit, the cheese curd enters the processing chamber 26 of the next unit which constitutes a contracting area thereof which constitutes the inlet side of the restricted pass of such next unit, the mandrel and rotary housing elements C2 and B2 of such next unit being rotated in the direction opposite to that of the preceding unit. Thus the cheese web is developed in the lower half of the chamber 26 in each unit and does not enter the upper half of this chamber; and is moved circumferentially in opposite directions in succeeding units. Correspondingly, the baffles 120 and the communication ports 121, 122 are located at opposite sides of successive units.

The units E, F, G, etc., embody respective outer rotatable housings B2 having end walls 123 closing the ends thereof except for the outlet ports 121 and inlet ports 122 which are joined by bridging tubular connecting conduits 124, the adjacent units E, F, G, etc., being spaced apart sufficiently to provide spaces for the operation of respective drives to the mandrels C2 and rotating housing units B2 respectively, and for the entry of connections to respective water supply lines 126 leading to respective nozzles 127 for injecting water into the respective expansion chambers 125, where the curd, undergoing expansion after being compressed in the restricted passes 25, is moistened by drawing in the moisture delivered from a respective nozzle 127. The pressure and lubricating effect of the water delivered against the approaching curd, assists in deflecting it from its circumferential path into the axial path of travel through a respective connecting conduit 124 into the next processing unit.

THE PROCESS AND APPARATUS AS DISCLOSED IN FIGS. 16, 17

FIG. 16 shows another modified form of apparatus for practicing a method broadly similar to that of FIGS. 1–6. Cheese curd 429 is delivered from a hopper 427 into a processing chamber 426 defined between converging walls of the hopper 427 and a rotating drum C4. The bottom of the hopper is continued below the drum C4 and upwardly around its opposite side in constantly converging relation thereto until it terminates at a restricted pass 425 wherein the curd is compacted to an initial stage of maximum compression. From the pass 425 the curd emerges into a second processing chamber 526 defined between a second rotating drum C5 and an arcuate shoe 501 which is arched over the top of the drum C5. The shoe 501 gradually converges toward the periphery of drum C5 in the direction of rotation of the latter, terminating at a restricted pass 525 where a second stage of compression of the curd is terminated. From the pass 525 the cheese web which has been developed during the previous stages of compression, is delivered into a third expansion chamber 626, defined between a third drum C6 and an arcuate shoe 502 extending beneath the same, in gradually converging relation to the periphery thereof, terminating at another restricted pass 625. Additional drums (not shown) are arranged in a succession similar to those disclosed, consecutive drums rotating in opposite directions and the cheese curd passing beneath one drum, over the next and beneath the next, etc., with alternate stages of compression in the passes 425, 525, etc., followed by expansion in the expansion 526, 626, etc. In the expansion chambers the curd is subjected to moistening from suitable means such as water spray introduced through jets 505, 605, etc.

Chamber 626 and subsequent processing chambers are closed at their inlet ends by baffle plates 527, 627, etc., which extend from the discharge ends of shoes 501, 502, etc., across the gaps between such ends and the opposed drums C5, C6, etc.

The rollers C4, C5, C6, etc., are preferably provided with knurled or equivalent roughened surfaces as indicated fragmentarily at 528, so as to provide traction between the drums and the cheese web. The internal surfaces of hopper 427 and shoes 501, 502, etc., are smooth, and the shoe surfaces are lubricated by the water sprays, to inhibit adherence of the web to these surfaces.

FIG. 17 discloses a variation of the apparatus of FIG. 16, wherein the curd and the cheese web developed therefrom are drawn beneath each of the drums C4, C5, C6, etc., the web issuing from restricted pass 425 at the end of the first processing chamber 426 being deflected downwardly by a blocking baffle plate 424 at the top of the next processing chamber 726 defined between the second drum C5 and a shoe 701 which is joined to the discharge end of hopper 427 and extends arcuately beneath drum C5. Similarly, the web discharged from restricted pass 525 at the discharge end of processing chamber 726, is deflected by a blocking baffle 524 into the next processing chamber, the deflection of the web being assisted by the water sprays from spray heads 505, 605, etc.

THE METHOD AND APPARATUS OF FIGS. 18–20

Instead of passing the web repeatedly around successive areas of the same continuous mandrel, it may be conveyed (e.g. in a straight line) beneath a succession of rolls which are spaced apart along the path of travel of the web so as to provide spaces in which the web may expand with a breathing action, and be subjected to the application of water which is absorbed into the web with the assistance of such breathing action. This modified form of the method, and an apparatus for practicing the same, are shown schematically in FIG. 18. Raw cheese curd is inserted through a hopper 127 in the top of a housing 71 enclosing a plurality of belt conveyors 72, 73, 74 etc., traveling around respective pairs of rollers 75 and 76. One roller of each pair is driven by suitable drive mechanism (not shown) so as to cause the belts 72, 73, 74 to travel in opposite directions as indicated by the arrows. The upper stretch of each belt provides a conveyor surface having a receiving end where it leaves its respective roller 75 and a discharge end where it passes around its respective roller 76. The receiving end of belt 72 is disposed beneath the hopper 70 to receive raw curd therefrom as indicated at 77. The receiving ends of belts 73 and 74 are projected beyond the discharge ends of the belts above them so as to receive the cheese web in successive stages of processing as indicated at 78 and 79 respectively. The housing 71 is provided with an outlet opening 80 through which the completely processed web 81 may issue, for further handling.

Respective series of transverse rollers 82, 83 and 84 are mounted in the housing 71 above the respective conveyor belts 72, 73, 74, their lower sides being spaced above the respective belts to provide respective restricted passes 85 between the rollers and the belts, through which the cheese curd 77 and the resulting web 78, 79 is drawn as it is carried lengthwise upon the belts. The first roller 82, adjacent the hopper 127, is positioned at a greater height above the belt 72 than the succeeding rollers 82, which are spaced successively closer to the belt 72 so that the passes 85 are of consecutively greater restriction in their order of succession extending away from the hopper 127 in the direction of movement of the belt 72.

Disposed in the spaces between the consecutive rollers 82 of the upper series are a plurality of water spray nozzles 88 which are operative to deliver respective sprays of pure water upon the stretches of cheese curd 89 extending between consecutive passes 85. After passing beneath each consecutive roller 82 and being compressed in the pass 85 thereof, the curd 89 will expand before reaching the next roller 82, producing a breathing action which causes the curd to absorb the spray delivered from the respective spray head 88. The water delivered from the spray heads 88 is heated to a temperature of about 130° F. Thus the curd is almost instantaneously brought to the optimum plasticizing temperature and is maintained at that temperature through successive stages of compression and expansion, with a maximum absorption of moisture during the expansion stages, and the web 78 which is delivered from the end of conveyor belt 72 downwardly to the next conveyor belt 73, is in a largely plasticized state.

On the belt 73, the web 78 is drawn through the relatively restricted passes 86 beneath the rollers 83 and between these rollers it is subjected to further water sprays from spray heads 90. Having been gradually widened while being rolled thin beneath the rollers 82 near the end of belt 72, the web 78 is subjected to infolding operations on the belt 73, in which its margins are folded inwardly by folding devices 91. These infolding operations are alternated with further rolling through the restricted passes 86, and further spraying of heated water from spray heads 90, with a resultant kneading and moistening operation which substantially completes the plasticizing of the web 79 which is delivered from the end of conveyor 73 on to the lower conveyor 74.

On the conveyor belt 74, the web 79 is drawn through the restricted passes 87 between rollers 84 and belt 74, and between these passes the web is subjected to a salting operation from a series of spray heads 92 delivering brine sprays downwardly upon the web, and a series of further infolding operations are performed by folding units 93.

The rollers 82, 83 and 84 are driven so as to rotate, as indicated by respective arrows, with their peripheral areas directly opposed to the belts 72, 73 and 74 moving in the same direction and the same speed as the belts.

FIG. 18 discloses schematically, a possible arrangement for driving the belts and rollers of FIG. 16 from a motor 95 through a reduction gear 96. A cluster of sprockets or pulleys 97 on the driven shaft of reduction gear unit 96 may be utilized to transmit drive through respective flexible drive elements 98, 99, 100 and 101 (chains or belts) to respective sprockets 175, 176 and 177 on the shafts of rollers 75, 76 and 77 respectively and to sprockets or pulleys 182, 183 and 184 on the rollers 82, 83 and 84 respectively.

FIG. 19 shows a plan view of a folding unit 99 which can be utilized for turning the margins of the cheese web. Such units can be supported by brackets 191 attached to the sides of housing 71.

Suitable water lines leading from a source of fresh water supply to the spray heads 88 and 90 and from a brine tank to the spray heads 92 are utilized but are not shown in the drawings.

THE METHOD AND APPARATUS OF FIG. 21

FIG. 21 shows a modification of the method and apparatus of FIGS. 18–20 wherein cheese curd is subjected to a stage of processing on a conveyor belt 172, traveling in a body of pure water 188 contained in a tank 171, the conveyor belt 172 being inclined upwardly from a charging end where it receives cheese curd from a hopper 170 and passing under a series of mixing drums 182. The belt 172 has a discharge end extending above the level of the body of water 188 and positioned to discharge the cheese web over the end of tank 171 and into the receiving end of a second tank 271 (which can be a longitudinal continuation of the tank 171, separated therefrom by a partition 272). A brine solution 192 is contained in the tank 271. The curd is carried through the brine solution 192 by a conveyor 174 which travels an upwardly inclined path from the entry side of tank 271 to a point approximately midway between its ends and then continues with a horizontal stretch 274 which is elevated above the surface of the brine solution.

In the tank 171, the curd 477, is passed beneath spaced mixing drums or rollers 182 which compress it against the belt 172 so as to gradually develop the cheese web, the stretches of the web between the drums 182 expanding and absorbing water from the bath 188. The drums 182 are mounted on swinging arms 282 which are pivoted at 382 to the sides of tank 171 and which press downwardly against the cheese web in response to gravity. The rollers 182 are mounted for free rotation which is imparted to them by the moving cheese web and by the belt 172 (in the event a roller 182 should make contact with the belt).

In the tank 271, the cheese web 178 passes beneath a series of space kneading rollers 187 which are likewise mounted on vertically swingable arms 287 pivoted to the walls of the tank at 387.

The belt 172 travels over end rollers 475 and 476, one of which is power driven to transmit movement to the belt in the direction indicated by the arrow. The belt 174, 274 likewise travels over end rollers 275 and 276, one of which is power driven to cause the belt 174 to travel as indicated by the arrow.

THE PROCESS AND APPARATUS OF FIG. 22

The method as operated in the apparatus of FIG. 22 is further modified in that the cheese curd 77 is initially compressed between a pair of opposed belts 372, moving downwardly in converging relation and terminating in a restricted pass 325 through which a cheese web 378 is delivered onto a conveyor belt 370. On the belt 373, the web 378 is passed beneath a series of spaced power-rotated drums 383 which compress the web against the belt 373 permitting it to expand in the spaces between the drums. Between the rollers 383 the web 378 is moistened either by overhead sprays as disclosed in FIGS. 18–20 or by submersion in water bath as in FIG. 21.

The compacting belts 372 travel around respective upper rollers 396 and lower rollers 397, the latter being power driven by a drive shaft 395. Belt 373 travels around end rollers 375. A common drive chain 399, trained around sprockets on the rollers 375, 397, 383 and an idler 400, is utilized to drive the belts 372 and 373 and the kneading rollers 383 in proper synchronized relation.

MODIFIED FROM—FIG. 23

As shown in FIG. 23, the curd may be directed in a circular path within a circular tank 871 having a rotating conveyor disc 872 covering the entire area of the tank bottom and providing a rotating false bottom therein. The cheese web 830, carried on the conveyor disc 872, is drawn successively beneath circumferentially-spaced rollers 882 of frusto-conical form having respective shafts 883 journalled at their outer ends in the peripheral wall of tank 871 and at their inner ends in the peripheral wall of tank 871 and their inner ends in a suitable spider 884 supported from the rim of tank 871 by bracket arms 881. Rollers 882 are spaced above conveyor disc 872 to define a circumferential series of restricted passes, with a spacing which decreases in the direction of rotation of disc 872, beginning at first roller 882 of the series, which is adjacent a charging hopper 870.

From the last roller 882 of the series, seen in the foreground of FIG. 23, the processed cheese web is delivered from the tank 871 through a discharge nozzle 880.

Conveyor disc 872 is secured to the lower end of a shaft 885 which extends through the disc 872 and has its lower end journalled in a suitable bearing (not shown) in the bottom of tank 871. Rollers 886 are driven by a crown gear 886 having teeth on its under side meshing with bevel gears 887 on the inner end of roller shafts 883. Crown gear 886 is secured on the lower end of a tubular drive shaft 888 which is rotated counter to the rotation of shaft 885. The rollers 882 are thus power-rotated with their lower sides rotating in unison with and in the same direction as the opposed conveying surface of disc 872.

Water spray heads 805 are mounted within the rim of tank 871 and are disposed so as to deliver respective sprays downwardly between rollers 882.

We claim:

1. Steps in the processing of cheese curd into plasticized cheese, comprising: feeding cheese curd in a continuous stream through a restricted pass defined between a spaced kneading surface and an opposed supporting surface; causing said kneading surface to penetrate said curd stream with a kneading action while moving with said stream; releasing said curd from said kneading action so as to effect breathing action of the curd by elastic expansion; and adding water to the expanding curd so as to effect absorption of moisture into the curd by said breathing action.

2. The processing steps defined in claim 1, wherein said curd is fed through a succession of said restricted passes defined between successive pairs of kneading and supporting surfaces; wherein the curd is released in spaces between said successive pairs of surfaces; and wherein said passes are of successively greater restriction so as to successively knead the curd stream to successively reduced thickness.

3. Steps in the processing of cheese curd into plasticized cheese, comprising: feeding cheese curd in a continuous stream through a series of restricted passes defined between spaced kneading rolls and opposed supporting surfaces; rotating said rolls with their peripheries moving with said curd stream and penetrating thereinto with a kneading action as the curd moves through said passes; releasing the curd from said kneading action in spaces between successive rolls, so as to effect breathing of the curd by elastic expansion; and adding hot water to the expanding curd so as to effect absorption of heat and moisture into the curd by said breathing action.

4. Steps in the processing of cheese curd into plasticized cheese, comprising: feeding cheese curd in a continuous stream through a series of restricted passes defined between spaced kneading and supporting surfaces, said kneading surface being of convex cylindrical form and being rotated so as to exert a feeding drag against the curd; releasing said curd from said kneading action in areas between successive passes, so as to effect breathing of the curd by elastic expansion; and adding hot water to the expanding curd so as to effect absorption of heat and moisture into the curd by said breathing action.

5. The processing steps defined in claim 4, wherein said kneading and supporting surfaces are elongated convex and concave cylindrical surfaces respectively, disposed in eccentric relation and defining a series of restricted passes along their lengths between their areas of closest opposition; and wherein said curd stream is developed into an elongated web which is drawn around said convex surface in a helical path proceeding through successive passes.

6. The processing steps defined in claim 5, wherein both of said cylindrical surfaces are rotated and wherein said water is caused to flow longitudinally between said cylindrical surfaces and to move said web longitudinally of said cylindrical surfaces so as to develop said helical path as said surfaces rotate.

7. The processing steps defined in claim 5, wherein both of said cylindrical surfaces are rotated so as to draw said web around said convex surface, and wherein said web is deflected by engagement with mechanical means into a helical path in response to its travel around said convex surface.

8. The processing steps defined in claim 4 wherein said supporting surface is moved linearly beneath a series of said cylindrical kneading surfaces and in unison with the opposed areas thereof defining a series of kneading passes.

9. A method of processing cheese, including the following steps: feeding raw cheese curd into a narrowing pass defined between surfaces moving in converging relation so as to compress the curd and to compact it into a substantially continuous cheese web; releasing the web from said narrowing pass and thereby effecting expansion of the web; applying hot water to the web during such expansion and thereby effecting absorption of heat and some of the water into the web; feeding the moistened web into a second narrowing pass and thereby compressing and kneading it; releasing the web from said second pass to again effect expansion of the web; and again applying hot water to the web during its expansion so as to effect further absorption of heat and moisture into the web.

10. The method defined in claim 9, wherein the steps of compression, kneading, expansion and application of hot water are repeated in successive stages until the cheese has attained a substantially homogenous plasticized state.

11. The method defined in claim 10, including the further step of adding salt to the web subsequent to the first of said stages.

12. The method defined in claim 11, wherein said salt is applied in the form of a brine solution, in lieu of the application of water.

13. The method defined in claim 8, wherein the water is applied in the form of a moving stream acting on the web to advance the web to successive positions for the successive stages of compression and expansion.

14. An improved method of processing cheese to a substantially homogenous state, comprising the following steps: feeding raw cheese curd into one end of a rotating cylindrical housing and into a processing chamber including a narrowing pass defined between the inner wall of said housing and the external cylindrical surface of a smaller cylinder disposed eccentrically in said housing and rotating in unison therewith at the narrow of said pass, and thereby causing said curd to be drawn by said housing and cylinder through said pass and thereby compressed and compacted into a web winding around said cylinder; effecting expansion of said web by discharging it between diverging opposed surfaces of said housing and cylinder after passing through said narrow; applying hot water to the web during such expansion and thereby effecting absorption of heat and some of the water into the web and feeding the moistened web circumferentially around said cylinder and into a second narrowing pass between said opposed surfaces of the housing and cylinder so as to effect a second stage of compression accompanied by kneading of the web and followed by further moistening after emergence of the web from the narrow of said second pass.

15. The method defined in claim 14, including the step of applying said water in a flowing stream on the discharge side of said passes and causing said stream to move longitudinally in the housing from said one end of the cylinder to the other, and utilizing said movement of the stream to feed said web longitudinally in said housing in the form of a generally cylindrical sleeve; gathering said sleeve into a discharge flow at said other end of the housing; and discharging said flow through said other end.

16. The method defined in claim 15, including a subsequent stage of feeding said discharge flow into a second processing chamber defined between a cylinder and housing similar to those of the first processing chamber; introducing a brine solution in lieu of water into the expanding area of said second chamber; and utilizing said brine solution for salting the web.

References Cited

UNITED STATES PATENTS

| | | | |
|---|---|---|---|
| 2,794,746 | 6/1957 | Schwartz | 99—243 X |
| 3,041,153 | 6/1962 | Elder et al. | 99—115 |
| 3,242,571 | 3/1966 | Langford | 31—46 X |

OTHER REFERENCES

Sanders, P. S., Cheese Varieties and Descriptions, U.S. Dept. of Agric., AGR Handbook No. 54 (pages 80, 81, 114 and 115).

ALVIN E. TANENHOLTZ, *Primary Examiner.*

D. M. NAFF, *Assistant Examiner.*